Patented Aug. 22, 1950

2,519,891

UNITED STATES PATENT OFFICE 2,519,891

SULFUR COATED DIAPHRAGM AND METHOD OF MAKING SAME

Reginald S. Dean and Frank R. Keeshan, Jr., Washington, D. C.; said Keeshan, Jr., assignor to said Dean No Drawing. Application April 19, 1947, Serial No. 742,746

7 Claims. (Cl. 260—722)

This invention relates to processes for filming sulphur surfaces with organic polymers, such as rubber, and to articles of manufacture made up in part of filmed sulphur surfaces and to methods of manufacturing such articles. One object of the invention is to provide a method for making thin continuous films of polymers on surfaces which are made of sulphur or which may be coated with sulphur. Another object is to provide compositions having new and unexpected mechanical properties. Still another object of the invention is to provide diaphragms and filters composed of foraminous supports with sulphur surfaces and having continuous coatings of chemically resistant polymers. Other aims and objects will appear from the examples given.

In any system comprising a solid surface and a dispersion there is an equilibrium between the tendency of the disperse material to coat the solid and the tendency of any coating on the solid surface to disperse. Examples of these opposite tendencies are found in a washing machine where "dirt" is dispersed from the cloth surface into the soap solution and alternatively an ore flotation machine where certain reagents are caused to leave dispersion in the pulp and coat some of the mineral particles.

The present invention is based on the discovery of conditions whereby organic polymers dispersed in an aqueous medium can be made to film a solid surface exposed to such an aqueous emulsion. For this purpose we have tried many solid surfaces but have found only one, sulphur, which lends itself to filming in this way from commercially available polymer dispersions having other valuable properties such as strength and chemical resistance.

The process of filming must be recognized as a definite co-action between the solid—in this case sulphur—and the dispersion of the polymer which invariably includes certain wetting agents. The number of variables is exceedingly large and we are by no means certain that with diligent search other materials than sulphur may not be found suitable as the solid base for the application of the process. We have, however, only been able to establish the conditions for accomplishing our result with sulphur and mixtures containing sulphur. Sulphur is furthermore cheap and plentiful, chemically resistant, may be readily powdered, formed and fritted and coated onto other solids because of its volatility and solubility in organic solvents. We desire therefore to restrict our invention to sulphur as the solid surface and to show the variation of other factors which limit the practice of our invention and the results obtained.

The more important factors which control the filming of a sulphur surface when exposed to an aqueous dispersion of an organic polymer are (1) the nature of the polymer, (2) the total solids, (3) the particle size, (4) the viscosity, (5) the nature of the wetting agent present, (6) the concentration of the wetting agent, and (7) the pH of the solution.

In the first place the polymer must be one which forms a continuous film on flocculation, since by interaction with the sulphur surface a continuous film must be deposited to provide our result. Further this film must form slowly so that all parts of a foraminous support, for example, may be penetrated. We have found these properties to be exhibited particularly in natural latex and in latices made from acrylic ester resins.

Both of these dispersions, however, must be stabilized by the addition of anionic wetting agents and must be neutral or slightly alkaline. Other synthetic latices may be used such as acrylonitrile-butadiene latex, neoprene latex and certain other co-polymer latices. The wetting agents which can be used also vary widely but all belong to the class known as anionic wetting agents, for example:

Sodium oleate
Sodium salt of di β ethyl hexyl ester of sin sulphon maleic acid
Ammonium salt of lauryl diethylene glycol sulphate
Sodium lauryl sulphate These reagents may be represented by one of the formulae:

R—OSO$_3$Na
R—OSO$_2$Na
R—COONa

The condensation products of fatty acids and alkylolamines may also be used as well as other anionic agents known in the art. It is exceedingly difficult to set down the various factors which determine the workability of any given combination of polymer dispersion and wetting agent.

As an empirical test we have found that if the dispersion is treated with a mild coagulant such as an alkali salt, e. g. 10% solution of sodium sulphate in equal amount, suitable combinations of polymer and wetting agent form, within a few minutes but not immediately, a continuous elastic film or mass of the polymer separating from the remainder of the dispersion without intermediate increase in viscosity. If the polymer separates as flocs or the entire dispersion sets to a gel, the proper relationship of polymer and wetting agent is not present for the practice of our invention.

In the following table we have set down the limiting conditions for the practice of our invention using a necessarily limited number of polymers and wetting agents. We do not wish our invention to be limited to these particular combinations as these illustrations together with the disclosures and simple test hereinbefore given will enable skilled chemists to find other combinations of polymers and wetting agents for the practice of our invention.

| Polymer | Total Solids | Particle Size | Viscosity | Wetting Agent | WA Conc. | pH |
| --- | --- | --- | --- | --- | --- | --- |
|  | Per cent | | Cp. | | Per cent | |
| Natural Rubber | 5-30 | .5-5$\mu$ | 3-30 | Na oleate | 1-5 | 7-9 |
| Acrylic Resin low molecular wt | 5-40 | .5-2$\mu$ | 3-20 | Na lauryl sulphonate | 1-4 | 7-8 |
| Acrylic Resin high molecular wt | 5-25 | .5-2$\mu$ | 3-20 | Na lauryl sulphonate | 1-4 | 7-8 |
| Acrylonitrile Butadiene Synthetic rubber | 5-50 | .5-1$\mu$ | 3-30 | Ammonium Lauryl diethylene Glycol sulphate. | 1-10 | 7-9 |
| Acrylic resin Copolymer with Vinyl chloride. | 5-20 | .5-2$\mu$ | 3-20 | Condensation product of alkylolamine and fatty acid. | 1-3 | 7-8 |
| 50-50 Butadiene Styrene | 35-40 | .5-3$\mu$ | 8-10 | Sodium naphthalene sulphonate | 1-10 | 9-11 |

Some commercially available forms of the above listed types of polmer dispersions are natural latex with added stabilizer, Hycar synthetic rubber dispersion which is of the acrylonitrile-butadiene type, Acrysol C-9 which is a dispersion of a relatively low molecular weight acrylic resin and Acrysol MR which is a dispersion of acrylic resin of higher molecular weight, and GR-S 50-50 which is a dispersion of Buna S with high styrene content to improve filming.

In the examples given of the practice of our invention we have used these commercially available materials.

One of the important forms of this invention is the coating of surfaces of metal and other solids with polymer films. This is accomplished by first coating the surface with sulphur.

The preferred method for sulphur coating is exposure to sulphur vapor at relatively low pressure. Other methods are treatment with molten sulphur or a solution of sulphur in a solvent such as carbon disulphide.

As an example of the practice of our invention in this way the following is given:

A copper wire screen is placed in a vacuum of one millimeter of mercury, sulphur is also placed in the vacuum space and heated to 200° C. After 5 minutes the screen has been coated with sulphur. It is now removed from the vacuum chamber and immersed in Acrysol C-9, a commercial aqueous dispersion of an acrylic resin, containing an anionic wetting agent. The screen is removed from the resin dispersion, drained, and dried. The openings will be found clear but the wires completely covered with the resin. Without the sulphur coating of this invention the interstices would be completely filled with resin.

In another example, a wire to be insulated for electrical purposes is subjected to sulphur vapor and then passed through a slightly ammoniacal natural latex, containing soap, wiped free of the excess of latex by a rubber squeegee and then passed through a dilute sulphuric acid solution to coagulate the latex.

In another example, a glass surface to be coated with a thin film of resin is coated with sulphur by evaporation in vacuum and then treated with a single drop of Acrysol C-9 and rotated at high speed to remove the excess of resin centrifugally.

In another example, a plaster cast is treated with sulphur vapor and then with Acrysol C-9 and then heated to 100° C. for 30 minutes to cure the Acrysol C-9 and provide a moisture proof coating for the plaster. The mechanical properties of the composition produced in this way are unexpectedly good, the tensile strength being in some instances as high as 8000 pounds square inch with substantial elongation.

In another example a fabric such as nylon is coated with sulphur by immersion in a solution of sulphur in carbon disulphide, the solution is evaporated and the sulphur coated fabric immersed in natural latex containing soap and then "doctored" or squeezed to remove excess latex and cured by immersion in dilute acid. The resulting fabric is waterproofed but with open pores to permit air circulation.

Another important form of this invention relates to storage battery separators. Heretofore storage battery separators have been made of a great variety of substances including sand, glass, rubber, wood and synthetic plastics. Two types of separators have been made, those where the conduction of electricity through the separator arises from tortuous but connected capillary passages which permit ion migration and solution diffusion but not convection and those in which the conduction of electricity is due to the ionpermeability of various membranes, such as undried rubber or gelatinous materials. Usually the latter type of membranes are placed on a foraminous support.

The present invention has for one of its objects the provision of improved separators of the first sort; that is, those with connected tortuous passages.

One of the simplest and best ways of making such a diaphragm is to frit particles of chemically resistant solids. This has been proposed for sand, glass, rubber, various plastics and other materials. Separators prepared in this way have many advantages. They are, however, necessarily mechanically weak since the particles are only attached at a few points.

Such separators have been treated with latex and other suspensions of rubber and rubber-like substances to reduce their porosity and increase their chemical resistance. Such treatment as carried out in the past has resulted in a more or less thin membrane covering the foraminous support and has produced a separator of the second class enumerated above. Alternatively the latex or like substance has agglomerated merely reducing the porosity of the foraminous support.

The present invention provides a separator having tortuous but connecting passages in which the particles making up the separator are coated and held together by a thin continuous film of polymer which does not block the passages. It also provides a filter having fine interistices and high corrosion resistance. Such filter media can be used for liquids or gases.

As an example, we take sulphur crushed to pass a 35 mesh but not a 65 mesh screen. We press this in a mold and frit at 110° C. The resulting porous sulphur plate we dip in a dispersion of acrylic resin known commercially as "Acrysol C-9." The plate is removed from the dispersion, drained and after drying, heated for one hour at 100° C. The result is a highly porous diaphragm. The coating of polymer on the surface of the sulphur particles is found to vary from 0.1 mg./cm.$^2$ to 1.0 mg./cm.$^2$. The mechanical properties of the composition formed by this process are entirely unexpected and of great importance.

Even with relatively coarse sulphur particles such as those of the example just given, the tensile strength of the body is greatly increased reaching values from 300/100 pounds per square inch with elongations up to 25% in two inches.

With finer sulphur particles the strength can reach 8000 pounds per square inch with not more than 0.2 mg. of polymer per square cm. of surface. The elongation of such compositions may be as high as 10% in two inches.

These mechanical properties make the composition of value for many purposes other than diaphragms and filters. For example shock and sound absorbing masses can be made from them. It is to be understood that while the following examples relate specifically to the making of diaphragms, the process with obvious variations would provide masses for mechanical or acoustical use and the composition will be useful for these and other purposes.

To return to the general example of treating a foraminous sulphur support if, instead of a foraminous sulphur support, a fritted glass body or a wire screen of the known art had been used, the result would be a continuous film of polymer which would be ion-permeable but would not permit diffusion of liquid. The combination of sulphur and polymer dispersion is necessary to achieve the result. This unique behavior of sulphur with respect to polymer dispersions may be easily illustrated by placing a drop of such a dispersion, for example "Acrysol C-9," on a glass, metal and sulphur surface respectively. On the glass and metal the drop stands up with high contact angle while on the sulphur the drop spreads out to a feather edge. By sulphur we mean to include in addition to pure elemental sulphur in the rhombic modification, modified or plasticized sulphur such as is commercially available. One form of such sulphur contains Thiokol but various other organic sulphur compounds have been used. Phosphorus has also been added. We have found that so long as the material used in our invention is composed of a major proportion of elementary sulphur good results are obtained.

Other foraminous supports coated with sulphur may be used and we have found that such coating can be conveniently produced by exposure to sulphur vapor or by dipping in a solution of sulphur in a solvent and allowing the solvent to evaporate.

Having now described our invention as it applies to the treatment of foraminous supports of sulphur, we give the following examples of its preferred applications for these purposes as illustrative and not restrictive.

The commercially available plasticized sulphur known in the trade as Vitrobond is crushed and sized by passing through a 65 mesh screen and taking only that portion of such material as remains on a 100 mesh screen. This material is lightly packed in a mold composed of two plates of glass separated by stainless steel. The mold which is 6 x 6" x 1/16" is placed in a horizontal position in an autoclave and a weight of 3 kg. placed on the upper glass plate. Steam pressure of 8 pounds per square inch is applied for 5 minutes. The use of steam pressure is not essential but has been found to lead to a surface of the sulphur more uniformly coated with the polymer in the further treatment. The pressure is removed and the mold taken out of the autoclave. The molded mass now has sufficient strength to be removed and placed on a screen support. This support with the molded mass is wholly immersed in a dispersion of rubber-like material known in the trade as "Acrysol C-9." After immersion for a few seconds, the mass is removed and placed upright to drain. After draining for 3 hours, the impregnated mass is heated at 100° C. for one hour in air. The diaphragm is now strong, flexible and porous and ready for use as a storage battery separator or as a filter for liquids or gases.

In another example, ordinary roll sulphur is crushed through 100 mesh and that portion retained on a 200 mesh screen is pressed into a mold and heated to 60° C. for a few minutes. The resulting mass though fragile may be removed from the mold and is immersed in a slightly ammoniacal solution of raw latex containing 25% solids and 3% sodium oleate. The mass is then removed, drained and dried at 100° C. for 30 minutes. It is then ready for use as a battery separator or as a filter for liquids or gases. Its mechanical properties are tensile strength 3500 pounds square inch elongation 20% in two inches.

In another example roll sulphur is mixed with 2% of Thiokol, melted and cast into molds. The solid product is crushed so that it all passes a 30 mesh screen. This pulverized material is mixed with 3% by weight of Acrysol C-9 and thoroughly stirred. It is then pressed in a mold using about 15 pounds per square inch and the mold with its contents heated to 100° C. for 30 minutes. The resulting mass when cooled and removed from the mold is ready for use as a battery separator.

In another example, powdered roll sulphur is mixed with a great excess of Acrysol C-9 and filtered on a fine screen. The filter cake is left on the screen and heated at 100° C. for 30 minutes. It is then removed from the screen and it is ready for use as an electrochemical diaphragm. Any tendency to stick on the screen can be corrected by coating the screen with a suitable parting compound, for example, graphite. Such a diaphragm will contain only about 3% by weight of resin. In distinction from other powders sulphur forms a readily filterable mixture with the polymer dispersion and the resulting filter cake is uniform and low in retained liquid.

In another example, a fine copper wire screen about 200 mesh is coated with sulphur by exposing it to sulphur vapor in a vacuum. This screen is then dipped in natural latex containing 30% solids and 10% lauryl diethylene glycol sodium sulphate and after draining the latex is coagulated in dilute acid. The resulting product is a corrosion resistant screen with fine round openings which can be used as an electrochemical diaphragm or other purposes.

In another example, a fabric such as canvas is immersed in a solution of sulphur in carbon bisulphide and dried. It is then immersed in Acrysol C-9, squeezed to remove the excess Acrysol and cured at 100° C. for 30 minutes. The resulting product is porous and chemically resistant and is useful as a diaphragm for various purposes.

In another example, sized particles of sulphur are suspended in a dispersion of acrylic resin, filtered to form a cake, stripped from the filter medium, pressed to form a flat diaphragm and the diaphragm cured by heating to 220° F. for 30 minutes.

In another example, the filter cake made as in the last example is stripped and cured by heating to 220° F. for 30 minutes and then pressed to form the diaphragm.

In an example illustrating more specifically a preferred method for the manufacture of sheets of the sulphur, polymer composition of our invention, we take powdered rhombic sulphur which passes a 65 mesh screen and remains on a 100 mesh screen, mix it with 10 times its weight of natural latex having 25% by weight of solids and 2% by weight of sodium oleate. The pH is adjusted with ammonia to 9.0. This mixture is fed onto a 100 mesh screen which is arranged as a continuous belt like that of a Fourdrinier paper machine. Under the first two feet of the screen is a suction chamber by which the excess latex is removed from the sulphur so that a layer one-quarter inch thick containing 3% dry polymer remains on the screen. The screen with the layer of sulphur passes next through an oven where the composition is dried at 100° C. The layer is then removed from the screen and trimmed to the desired size.

In another example using the same type of modified Fourdrinier machine the sulphur is placed on the screen dry and the dry layer and screen are passed over a smooth surface and pressed under a few pounds per square foot at 110° C. The fritted sulphur and screen are then passed through a bath of Acrysol C-9, drained and then heated to 100° C. for 10 minutes. The dried sulphur polymer composition is then removed from the screen. Removal from the screen is facilitated by treating the screen beforehand with graphite.

What is claimed is:

1. An improved diaphragm having tortuous capillary passages, the diaphragm being made up of particles of sulphur enveloped in a continuous non-porous film of a long chain polymer selected from the class consisting of natural rubber, acrylic resin, co-polymers of acrylic resin, and synthetic rubbers based on butadiene, said diaphragm having open capillary passages.

2. An improved diaphragm made up of a foraminous support composed of sulphur and a continuous non-porous film of a long chain polymer selected from the class consisting of natural rubber, acrylic resin, co-polymers of acrylic resin, and synthetic rubbers based on butadiene, said film covering the sulphur but not filling the foramina.

3. The process of producing a thin continuous film on a sulphur surface which is characterized by immersing the sulphur surface in an aqueous dispersion of a long chain polymer selected from the class consisting natural rubber, acrylic resin, co-polymers of acrylic resin, and synthetic rubbers based on butadiene, said dispersion being characterized by forming, within a few minutes but not immediately, a continuous elastic mass on the addition of an equal amount of 10% solution of sodium sulphate, the dispersion containing 5 to 50% of the polymer, said polymer having a particle size of 0.5–5.0 microns and said dispersion 0.1–10% of an anionic wetting agent.

4. The process of claim 3 characterized by the step of drying the film above the temperature of flow of the polymer but below the melting point of sulphur.

5. The process of claim 3 further characterized by the polymer being an acrylic resin.

6. The process of claim 3 further characterized by the polymer being natural rubber.

7. The process of claim 3 further characterized by the polymer being a butadiene-styrene synthetic rubber.

REGINALD S. DEAN.
FRANK R. KEESHAN, Jr.

REFERENCES CITED

The following references are of record in the file of this patent:

UNITED STATES PATENTS

| Number | Name | Date |
|---|---|---|
| Re. 20,029 | Fischer | July 7, 1936 |
| 311,294 | Conradson | Jan. 27, 1885 |
| 703,896 | Cochrane | July 1, 1902 |
| 1,528,537 | Draemann | Mar. 3, 1925 |
| 1,929,812 | Ellis | Oct. 10, 1933 |
| 1,977,748 | Webster | Oct. 23, 1934 |
| 2,028,482 | Tucker | Jan. 21, 1936 |
| 2,032,923 | Eldridge | Mar. 3, 1936 |
| 2,304,858 | Stewart et al. | Dec. 15, 1942 |

FOREIGN PATENTS

| Number | Country | Date |
|---|---|---|
| 375,157 | Great Britain | June 23, 1932 |

OTHER REFERENCES

India Rubber World of March 1, 1922, pp. 418–419.